Figure 1:

Nov. 1, 1966  S. LOEB ETAL  3,283,042
METHOD OF FORMING POROUS MEMBRANES
Filed Aug. 23, 1963

INVENTORS
SIDNEY LOEB
GARGESWARI R. NAGARAJ
BY Olbert M. Herzig
ATTORNEY

United States Patent Office 3,283,042
Patented Nov. 1, 1966

3,283,042
METHOD OF FORMING POROUS MEMBRANES
Sidney Loeb, Los Angeles, Calif., and Gargeswari R. Nagaraj, Lawrence, Kans., assignors to the Regents of the University of California, Berkeley, Calif.
Filed Aug. 23, 1963, Ser. No. 304,228
9 Claims. (Cl. 264—49)

In general, the present invention relates to a method of preparing a semipermeable membrane adapted to permit substantially selective diffusion therethrough of a solution. More particularly, the present invention relates to a membrane adapted to recover fresh water from a salt solution, such as sea water. The method of the present invention is a method incorporating improvements over the method disclosed in applicant's copending applications, specifically, High Flow Porous Membranes for Separating Water from Saline Solutions, Serial No. 72,439 filed November 29, 1960, by Sidney Loeb and Srinivasa Sourirajan and now issued as Patent No. 3,133,132; High Flow Porous Membranes for Separating Water from Saline Solutions, Serial No. 181,013 filed March 20, 1962, by Sidney Loeb, Srinivasa Sourirajan and Dallas E. Weaver and now issued as Patent No. 3,133,137; and Fresh Water Recovery, Serial No. 197,609 filed May 25, 1962, by Sidney Loeb.

The Federal Government has embarked on an extensive research program to solve the problem of recovering fresh water economically from saline water, such as sea water or the brackish subsoil water bodies. Such research program has evolved many methods for recovering fresh water from sea water. However, no recovery method has yet been made sufficiently economical. Most methods of fresh water recovery from saline solutions involve the transfer of heat under thermodynamically irreversible conditions so that the process as a whole is unavoidably inefficient. In addition, in order to obtain the high rate of heat flow necessarily required, saline solutions are normally handled at relatively high temperatures which results in severe corrosion and scale problems. Also, the heat transfer approach normally requires a large number of stages in series to increase heat economy so that a large amount of equipment and much operational maintenance is required.

The membrane produced by the method of the present invention may be utilized in a simple process which can be made to approach thermodynamic reversibility to simply produce potable water (less than 500 p.p.m. dissolved salts) from a sea water brine containing solids in considerably greater concentration than is found in sea water in a single step. As described in the aforementioned copending applications, the salt water is pushed against a membrane, such as the one produced by the methods described in the present application, under a hydraulic pressure somewhat greater than the osmotic pressure of the salt (approximately 350 p.s.i. for fresh water-sea water interface). A reverse osmosis appears to occur and fresh water flows through the membrane from the saline water side. However, the production of membranes useful in such simplified process for the recovery of fresh water has to date been hampered by the limited range of materials which have been found to be useful in such production.

Consequently, an object of the present invention is a method of producing membranes for a reverse osmosis process from a wider range of materials.

Other objects and advantages of the present invention will be readily apparent from the following description and examples which illustrate exemplary embodiments of the present invention.

In general, the present invention involves a method of preparing a semipermeable membrane adapted to permit substantially selective diffusion therethrough of a component of a solution. The method of the present invention involves, first, dissolving in an organic solvent a cellulosic ether or ester derivative having the formula

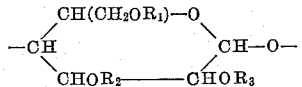

wherein $R_1$, $R_2$ and $R_3$ are members of a group consisting of H, $R_4$ and $CR_5O$ wherein $R_4$ is an alkyl group containing 1 to 8 carbon atoms and $R_5$ is an alkyl group containing 1 to 7 carbon atoms. Also dissolved in such organic solvent is a pore-producing salt having an anion from the class consisting of iodide, bromide, tetraphenyl boron, salicylate, chlorate, tetraiodomercurate and fluosilicate. In addition, preferably, a different pore-regulating inorganic compound is dissolved in the organic solvent which has an anion from the class consisting of halides and oxygenated halides. Such solution is then cast to form a membrane of substantially uniform thickness and a major portion of the organic solvent is then evaporated for a predetermined period of time. The cast membrane may be then immersed in water and heated, with such immersion and heating being done either in sequence or simultaneously. It should be noted that the terms "porosity" and "permeable" as used in the present application refer only to the fact that the membrane has a structure which allows the selective flow therethrough of an appreciable rate of fresh water under suitable conditions.

The film forming material utilized in the method of the present invention is a cellulosic ether or ester derivative having the formula

Figure 2:
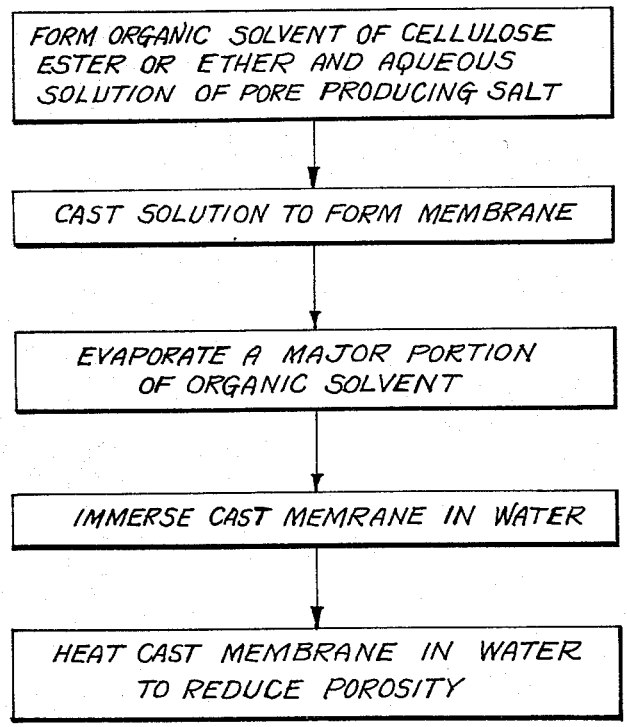

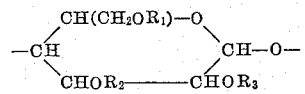

wherein $R_1$, $R_2$ and $R_3$ are members of a group consisting of H, $R_4$ and $CR_5O$ wherein $R_4$ is an alkyl group containing 1 to 8 carbon atoms and $R_5$ is an alkyl group containing 1 to 7 carbon atoms. Specific examples of such cellulosic derivatives are cellulose acetate, cellulose acetate-butyrate, cellulose propionate and ethyl cellulose. In addition to the film matrix cellulosic derivative, an aqueous solution of a salt having an anion from the class consisting of iodide, bromide, tetraphenyl boron, salicylate, chlorate, tetraiodomercurate and fluosilicate may be used as a pore-producing salt. Typical results from using cellulose acetate and such pore-producing salts in the method of the present invention are set forth below with reference to the data in Table I and the attached sheet of drawing wherein FIGURE 1 is a schematic cross section of casting apparatus suitable for performing the process of the invention and FIGURE 2 is a block diagram of a flow sheet for the process. The data of Table I was obtained by utilizing a casting solution composed of cellulose acetate, acetone and approximately 10% by weight of an aqueous solution of the particular salt. The weight ratio of the acetone to the cellulose acetate was about 3/1 and the weight ratio of the salt solution to the cellulosic derivative was about 1/2. The solution was then cast at a temperature of about $-8°$ C. to $11°$ C. on a cold glass plate 3 which had 0.010 inch thick side runners 4 to give this thickness to the as-cast film 5. The film 5 was cast by passing an inclined knife 6, the back wall of which forms an integral frame containing an excess of the casting solution across the glass plate with the knife pressing on the side runners only. A major portion of the acetone was then allowed to evaporate from the membrane while in a cold box for a predetermined period of time after which the film and plate were immersed in ice water for at least about an hour. The film was then removed from the glass plate and heated in hot water for about fifteen minutes at a predetermined temperature. After heating, the membrane was ready for use by utilizing the side of the membrane which was away from the glass during the casting toward the brine solution from which fresh water was recovered. A feed brine of 5¼% sodium chloride in tap water was then applied to the membrane under a final pressure of about 1500 p.s.i.g. Such pressure was achieved in steps with a pressure of 1000 p.s.i.g applied first for about fifteen minutes. The production rate of desalinized water and the salt content of the fresh water so produced were then measured.

The film-forming cellulosic derivative and pore-producing salt are dissolved as set forth above in an organic solvent which is miscible with water and dissolves the pore-producing salt. Such organic solvent provides a casting solution of desired viscosity so that the solutions are not too viscous to prevent casting of uniform film, but sufficiently viscous to prevent the film produced becoming jelly-like upon immersion in water. Typical organic solvents which have been found useful in the present invention are acetone, methyl ethyl ketone, ethyl alcohol, methyl alcohol and mixtures of one or more of such solvents. It should be noted that acetone has been found to give unexpectedly good results with respect to the resulting membrane characteristics. The weight ratio TABLE I.—REPLACEMENTS FOR MAGNESIUM PERCHLORATE AS PRIMARY ADDITIVE IN CASTING SOLUTION

| Pore Producing Salt | Composition of Casting Solution (wt. percent) | | | | Time Between Casting and Immersion (minutes) | Heating Temp., °C. | Desalinization Characteristics | |
|---|---|---|---|---|---|---|---|---|
| | Pore Producing Salt | Water | Cellulose Acetate | Acetone | | | Product Flux, gal./ft.² day | Product Salt Content, percent |
| CdBr₂ (hydrated) | 2.2 | 8.8 | 22.2 | 66.7 | 3 | 82.3 | 4.1 | 0.05 |
| | 4.4 | 6.6 | 22.2 | 66.7 | 6 | 70.0 | 6.9 | 0.30 |
| CdBr₂ (anhydrous) | 1.1 | 10.0 | 22.2 | 66.7 | 10 | 81.0 | 15.3 | 0.60 |
| | 2.2 | 8.9 | 22.2 | 66.7 | 3 | 69.5 | 9.3 | 0.19 |
| KI | 5.5 | 5.5 | 22.2 | 66.7 | 6 | 82.5 | 7.4 | 0.08 |
| | 5.5 | 5.5 | 22.2 | 66.7 | 3 | 84.5 | 6.7 | 0.10 |
| NaI | 2.2 | 3.9 | 22.2 | 66.7 | 10 | 90.0 | 11.0 | 0.80 |
| | 3.3 | 7.8 | 22.2 | 66.7 | 6 | 81.6 | 15.7 | 0.60 |
| NaB(C₆H₅)₄ | 1.1 | 10.0 | 22.2 | 66.7 | | 84.5 | 5.6 | 0.16 |
| | 2.2 | 8.9 | 22.2 | 66.7 | | 84.0 | 4.8 | 0.13 |
| Sodium Salicylate | 1.1 | 10.0 | 22.2 | 66.7 | 10 | 82.6 | 8.6 | 0.70 |
| NaClO₃ | 3.3 | 7.8 | 22.2 | 66.7 | 12 | 72.5 | 17.4 | 0.85 |
| K₂HgI₄ | 17.5 | 15.8 | 16.7 | 50.0 | 1.5 | 72.0 | 13.8 | 0.78 |
| | 17.5 | 15.8 | 16.7 | 50.0 | 3 | 72.0 | 6.1 | 0.14 |

The concentration of the bore-producing salt in its aqueous solution may range from about 5% by weight to a saturated solution. Thus, as illustrated, the weight percent may range from 5% to 60%. The time between casting and immersion may range from about 1 to 12 minutes, while the heating temperature may range from about 70° C. to 90° C., and the heating time, while not critical, should exceed one-half minute for best results.

It should be noted that although an aqueous solution of the pore-producing salt is generally preferred, the pore-producing salt may be utilized as a solid without the addition of water. Thus, the thiocyanate anion was added as potassium thiocyanate to form a casting solution with the composition of by weight as follows: 9.1% potassium thiocyanate, 22.7% cellulose acetate, and 68.2% acetone. The procedure set forth above was followed with the time between casting and immersion being three minutes and the heating temperature being about 82° C. The typical resulting desalinization characteristic was a product flux of 9.2 gallons/feet² day and product salt content of .014%.

of the organic solvent to cellulosic derivative is normally in the range of about 2/1 to 6/1, with the ratio of about 3/1 being preferred, especially for the combination of acetone and cellulose acetate. The weight ratio of the aqueous pore-producing salt solution to the cellulosic derivative is between about 3/1 and 1/3, with the ratio of about 1/2 being preferred.

In addition to the foregoing organic solvents, acetic acid and formic acid have been found useful in the present invention. By the use of such organic solvents, it was found that the casting and immersion could be done at room temperature and thus eliminate the necessity of cooling the casting and immersion solutions when organic solvents, such as acetone, are utilized. Possibly, the low volatility of such organic solvents prevents them from readily evaporating from the freshly cast membrane and thus permits such casting and immersion at room temperature. As set forth in Table II below, the acetic acid and formic acid were utilized in combination with perchlorate as the anion while employing the casting solution specified and the procedure set forth above.

TABLE II

| Organic Solvent | Composition of Casting Solution (wt. percent) | | | | Time Between Casting and Immersion in Water | Heating Temp., °C. | Desalinization Characteristics | |
|---|---|---|---|---|---|---|---|---|
| | Magnesium Perchlorate | Water | Cellulose Acetate | Organic Solvent | | | Product Flux, gal./ft.² day | Product Salt Content, percent |
| Acetic Acid | 1.6 | 6.6 | 16.5 | 75.3 | 1 | 82.7 | 1.82 | 1.10 |
| | | | | | 3 | 82.0 | 12.6 | 0.14 |
| | | | | | 3 | 84.0 | 14.3 | 0.13 |
| | | | | | 10 | 82.3 | 11.1 | 0.17 |
| | | | | | 10 | 84.0 | 10.4 | 0.09 |
| | 2.0 | 7.9 | 19.9 | 70.2 | 3 | 85.0 | 10.4 | 0.15 |
| | | | | | 6 | 76.0 | 16.3 | 0.40 |
| | | | | | 6 | 86.0 | 5.8 | 0.06 |
| | | | | | 10 | 86.0 | 5.6 | 0.07 |
| | | | | | 2) | 82.0 | 8.1 | 0.13 |
| | ¹ 1.64 | 6.57 | 16.57 | 75.00 | 3 | 88.0 | 2.8 | 0.87 |
| | | | | | 6 | 85.0 | 14.8 | 0.18 |
| | (²) | | | | 10 | 86.0 | 7.0 | 0.32 |
| | | | | | 3 | 85.0 | 39.2 | 2.00 |
| Formic Acid | 2.2 | 8.90 | 22.20 | 66.60 | 1.5 | 84 | 9.8 | 0.24 |
| | | | | | 3 | 86 | 12.6 | 0.48 |
| | | | | | 10 | 84 | 224.0 | 0.36 |

¹ Composition includes 0.22% by weight of hydrochloric acid.
² Composition includes 0.22% by weight of sodium chloride.

The production rate of the resulting membrane may be increased by the addition of a pore-regulating compound to the casting solution which dissolves therein. Such pore-regulating salt usually will not alone result in appreciable production rate through the membrane. However, it does have a surprising and unexpected result of increasing the production rate through the membrane in combination with the pore-producing salt. Such pore-regulating salt or acid usually has an anion from the class consisting of halides and oxygenated halides. Specific pore-regulating compounds which have been found useful in the present invention include sodium chloride, sodium bromide, sodium iodide, sodium chlorate, hydrochloric acid, magnesium chloride, lithium chloride and aluminum chloride. However, the use of sodium chloride and hydrochloric acid has been found to be unusually and unexpectedly beneficial and both increases the production rate and reduces the product salt content. The weight ratio of the pore-producing salt to the pore-regulating salt should be in the range of about 10/1 to 1/1 with the ratio of about 10/3 being preferred, especially in the combination of magnesium perchlorate with sodium chloride. See, for example, Table II wherein sodium chloride and hydrochloric acid were utilized.

After the casting solution has been prepared, it may be cast to form a membrane of substantially uniform thickness. For example, in the standard method of membrane preparation the casting solution is poured onto a cold glass plate with 0.01-inch side runners to give this thickness to the as-cast film. The film is then cast by passing an inclined knife across the glass plate which rests on the side runners. The inclined knife is preferably pulled across the plate at a predetermined slow rate. For example, when the length of the plate is about 8 inches the traverse of the knife required is normally accomplished in the range of about 0.13 to 0.25 minute without substantially affecting the results. Too slow a period of time permits excessive evaporation, while too fast a traverse time results in an imperfect surface formation or even rupture of the film. The cast membrane may then be first immersed in water at about 0° C. after a predetermined period and then heated in hot water for fifteen minutes in the range of about 70° C. to 90° C. Alternatively, the heating step may involve immersing in water at about 50° C. and heating up to about 80° C. over a period of about one-half hour. Such combination of immersion in ice water and heating in hot water removes the salts from the cast membrane and reduces its porosity so that a low salt content product may be achieved.

The cast membrane may be treated by immersing it in a cold solution of an inorganic treating salt. Among other possible effects, such treatment has been found to remove the inorganic salt in the membrane and reduce the porosity of the membrane. The treating salt solution is preferably below about 0° C., with a preferred temperature being about —5° C. The treating salt may be any of the salts utilized as a pore-regulating salt and, in fact, the treating salt may be the same salt as utilized for pore regulation. However, it is preferred that sodium chloride be utilized in the treating salt solution with a concentration in the range of about 5% to 25% by weight.

There are many features in the present invention which clearly show the significant advance the present invention represents over the prior art. Consequently, only a few of the more outstanding features will be pointed out to illustrate the unexpected and unusual results attained by the present invention. One of the features of the present invention is that it utilizes a wide range of pore-producing salts to produce the membrane of the present invention. Another feature of the present invention is that it utilizes organic solvents having low volatility to form the casting solution so that the casting and immersion of the resulting membrane may be carried out at room temperature. Still another feature of the present invention is the utilization of the pore-producing salt in solid form rather than an aqueous solution whereby the preparation of the casting solution is simplified.

It will be understood that the foregoing description and examples are only illustrative of the present invention and it is not intended that the invention be limited thereto. All substitutions, alterations, modifications of the present invention which come within the scope of the following claims or to which the present invention is readily susceptible without departing from the spirit and scope of this disclosure are considered part of the present invention.

We claim:
1. A method of preparing a semipermeable membrane adapted to permit substantially selective diffusion therethrough of a component of solution, comprising:
  (a) dissolving:
    (I) a cellulosic ether or ester derivative having the formula

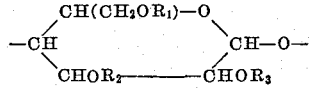

wherein $R_1$, $R_2$ and $R_3$ are members of a group consisting of H, $R_4$ and $CR_5O$ wherein $R_4$ is an alkyl group containing 1 to 8 carbon atoms and $R_5$ is an alkyl group containing 1 to 7 carbon atoms, and
    (II) an aqueous solution of a pore producing salt having an anion from the class consisting of iodide, bromide, tetraphenyl boron, salicylate, chlorate, tetraiodomercurate and fluosilicate, in an organic solvent which is miscible with water and dissolves said cellulosic derivative and said pore producing salt:

(b) casting said solution to form a membrane of substantially uniform thickness;
  (c) evaporating a major portion of said organic solvent;
  (d) immersing the cast membrane in water to remove said salt; and
  (e) heating the cast membrane in water to reduce its porosity.

2. A method as stated in claim 1 wherein said cellulosic derivative is a member of the class consisting of cellulose acetate, cellulose acetate-butyrate, cellulose propionate and ethyl cellulose.

3. A method as stated in claim 1 wherein a pore-regulating inorganic compound is also dissolved in said casting solution, said pore-regulating compound having a different anion from the class consisting of halides and oxygenated halides.

4. A method as stated in claim 3 wherein said pore-regulating compound is a member of the class consisting of sodium chloride and hydrochloric acid.

5. A method as stated in claim 1 wherein said organic solvent is a member of the class consisting of acetone, acetic acid, formic acid, methyl ethyl ketone, ethyl alcohol, and methyl alcohol.

6. A method as stated in claim 1 wherein said evaporation period is in the range of about 3 to 20 minutes.

7. A method as stated in claim 1 wherein said organic solvent is a member of the class consisting of acetic acid and formic acid and said casting and evaporating are carried out at room temperature.

8. A method as stated in claim 1 wherein said organic solvent is acetone and said casting and evaporating are carried out at a temperature in the range of about —16° C. to 0° C.

9. A method of preparing a semipermeable membrane adapted to permit substantially selective diffusion therethrough of a component of a solution, comprising:
  (a) dissolving:

(I) a cellulosic ether or ester derivative having the formula

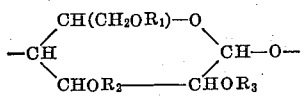

wherein $R_1$, $R_2$ and $R_3$ are members of a group consisting of H, $R_4$ and $CR_5O$ wherein $R_4$ is an alkyl group containing 1 to 8 carbon atoms and $R_5$ is an alkyl group containing 1 to 7 carbon atoms and (II) a pore producing solid thiocyanate salt in an organic solvent;

(b) casting said solution to form a membrane of substantially uniform thickness;

(c) evaporating a major portion of said organic solvent;

(d) immersing the cast membrane in water to remove said salt; and (e) heating the cast membrane in water to reduce its porosity.

References Cited by the Examiner

UNITED STATES PATENTS

| | | | |
|---|---|---|---|
| 2,846,727 | 8/1958 | Bechtold | 264—49 |
| 3,133,132 | 5/1954 | Loeb et al. | 264—49 |
| 3,133,137 | 5/1964 | Loeb et al. | 264—41 |

OTHER REFERENCES

Bulletin de la Societe Chemique de France. Bulletin 5E Serie, Tome 3, part I, 1936, pp. 312–318, "Les perchlorates comme solvents de la cellulose et de ses derives," by A. Dorby.

Weissberger, Arnold, ed. Technique of Organic Chemistry, vol. III, part I, Separation and Purification, 2nd edition, New York, Interscience Publishers, 1956, pp. 713–718.

ALEXANDER H. BRODMERKEL, *Primary Examiner.*

P. E. ANDERSON, *Assistant Examiner.*